United States Patent [19]

Basic, Sr.

[11] Patent Number: 4,706,578
[45] Date of Patent: Nov. 17, 1987

[54] PULSATING INCINERATOR HEARTH

[76] Inventor: John N. Basic, Sr., 21 W. 161 Hill St., Glen Ellyn, Ill. 60137

[21] Appl. No.: 659,849

[22] Filed: Oct. 9, 1984

Related U.S. Application Data

[63] Continuation of Ser. No. 362,853, Mar. 29, 1982, Pat. No. 4,475,469, which is a continuation-in-part of Ser. No. 248,054, Mar. 27, 1981, Pat. No. 4,438,705.

[51] Int. Cl.$^4$ ............................................... F23N 7/08
[52] U.S. Cl. ............................... 110/281; 110/101 A; 110/255; 110/286; 110/341
[58] Field of Search ............... 110/255, 258, 268, 278, 110/281, 280, 286, 101 A, 341; 414/156

[56] References Cited

U.S. PATENT DOCUMENTS

| | | | |
|---|---|---|---|
| 527,453 | 10/1894 | Richards | 110/281 |
| 527,593 | 10/1894 | Coxe | 110/281 |
| 3,814,568 | 6/1974 | Wittmann | 431/170 X |
| 4,250,818 | 2/1981 | Sigg | 110/281 X |
| 4,475,469 | 10/1984 | Basic, Sr. | 110/281 |

Primary Examiner—Edward G. Favors

[57] ABSTRACT

A pulsating hearth for an incinerator wherein the hearth is suspended on a fixed frame for movement in a limited short arc to urge random size particles burning in a pile on the hearth in a predetermined path intermittently across the surface of the hearth. Movement is imparted to the hearth in periodic pulses preferably by inflating sets of air bags mounted on the frame, which stroke the hearth to move it a short distance from an initial position and jar it against the frame, thus impelling the burning particles a short distance by inertia and concurrently stoking the burning pile upon each stroke, and then returning the hearth to its initial position. The hearth may also have a plurality of nozzles connected to a source of air for delivering gently flowing air to the burning pile on the hearth.

41 Claims, 14 Drawing Figures

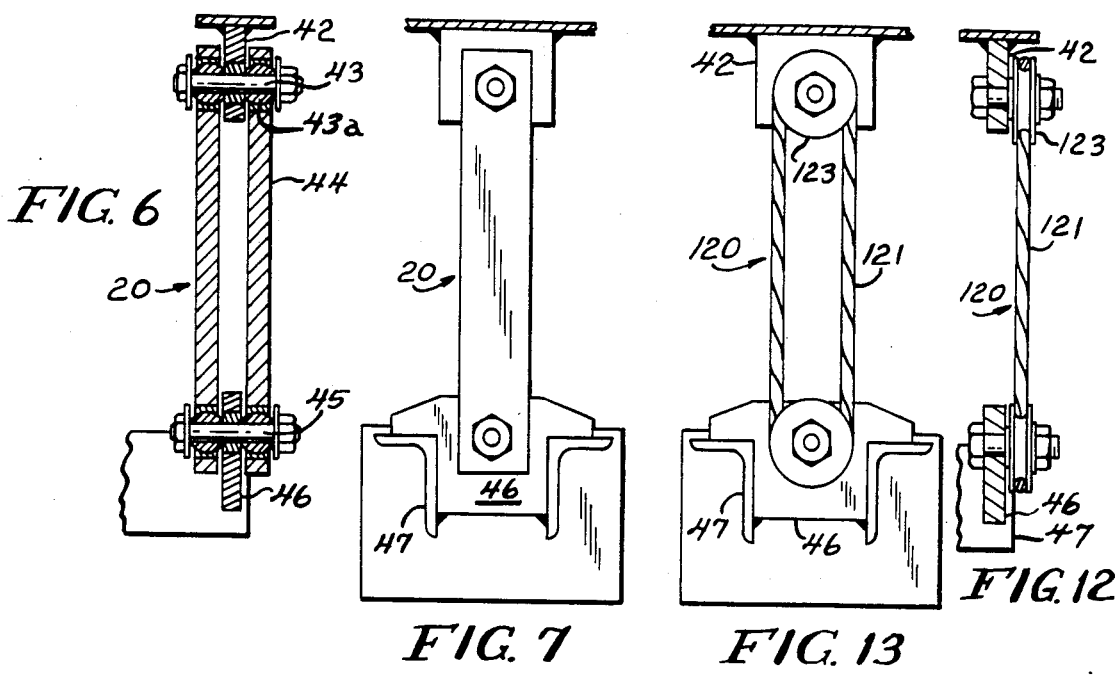
FIG. 6  FIG. 7  FIG. 13  FIG. 12
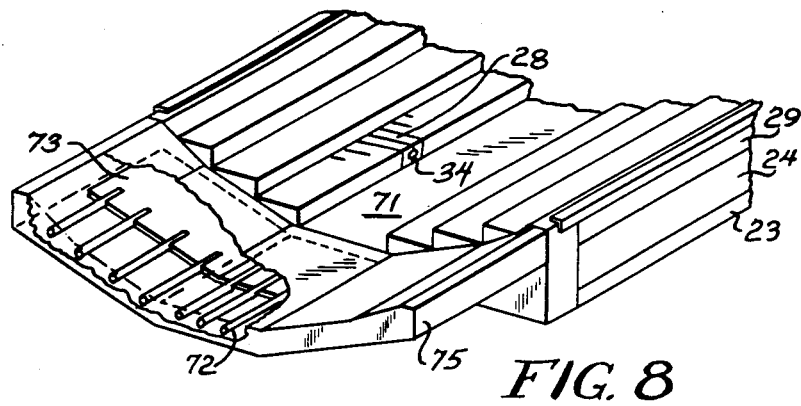
FIG. 8
FIG. 9
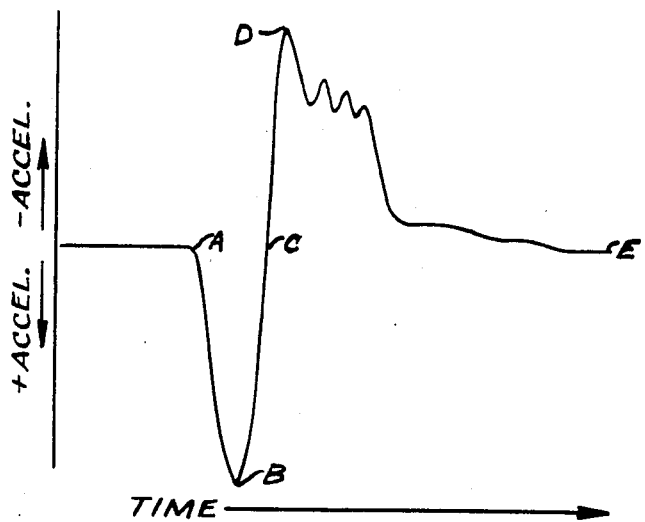
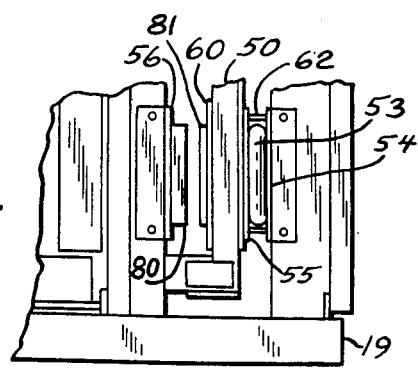
FIG. 11

PULSATING INCINERATOR HEARTH

This is a continuation, of application Ser. No. 362,853, filed Mar. 29, 1982 now U.S. Pat. No. 4,475,469 which is a continuation-in-part of co-pending application Ser. No. 248,054, filed Mar. 27, 1981, U.S. Pat. No. 4,438,705 INCINERATOR WITH TWO REBURN STAGES AND, OPTIONALLY, HEAT RECOVERY.

BACKGROUND OF THE INVENTION

This invention relates to a pulsating hearth for an incinerator, and is more particularly directed to such a hearth which is capable of concurrent intermittent moving and stoking of a pile of random size particles burning on the hearth.

Incineration may provide acceptable means for disposing of waste, for heat processing of various materials, and for recovery of heat from burning refuse; however, the process of incineration has had imposed upon its use severe and substantial limitation. Some incinerators requires removal of materials not fully combustible in prior art systems or burnable only with undesireable side effects or hazards; thus a sorting step is necessary for use of such processes and equipment. Other incinerators need shredded material for burning and that prerequisite also requires extra processing and equipment. Most prior art incinerators are incapable of meeting environmental standards, and require one or more of a wide range of auxiliary equipment, such as afterburners, scrubbers, precipitators and the like to make them function.

Even with suitable pre-incineration processes and equipment and auxiliary environmental protection devices, full combustion of random refuse material is seldom achieved, because adequate oxygenation of the burning particles is required, although the burning cannot be so rapid as to make the fire too hot or permit excessive gasification or atomization of the burning particles or the products of combustion. Optimum nonpolluting combustion requires close control of the time, turbulence and temperature of the burning process. The problem is further magnified when the refuse contains plastics, wet refuse and liquids and when unburned particles are permitted to escape from the main burning chamber.

Preferably the main burning chamber of an incinerator has a hearth floor. However, such a hearth has some inherent problems requiring solution for effective and efficient combustion of random refuse. The refuse on the hearth must receive an even distribution of oxygen for the material to burn. Air must be mixed with the burning material and dispersed. Air alone, particularly with high velocities, will entrain and lift burning particles before they are fully consumed. The uncontrolled rapid burning of the pile may also increase velocities. Such high velocities and the accompanying incomplete burning results in slagging and tends to clog up the incinerator floor, as well as to permit incompletely burned particulate and products of combustion to exit the main burning chamber of the incinerator before they are adequately consumed.

Some incinerators have been constructed using a starved air principle in their main burning chamber, but in these devices the lack of oxygen does not permit the burning of hydrocarbons to convert to water and carbon dioxide, thus carbon monoxide is frequently formed, representing a hazard to operating personnel and restricting use of such devices to very well ventilated areas.

Additionally, it is often desired to control the rate and extent of the burn in the main combustion chamber, without either the risk of pollution or the loss of desired selected unburned or ash products. For example, in some incinerator processes it is desired to burn perhaps 75% of each particle, but no more, and return the mostly burned particles before it is entirely reduced to ash. In other processes, it is desired to burn off readily combustible coatings and retain substrata unburned and not damaged by heat. In these situations it is particularly useful to control both the rate of burning and the time that the particle to be burned is subject to the heat of combustion.

SUMMARY OF THE INVENTION

By employing a pulsating hearth embodying the present invention, adequate oxygenation of the burning pile is achieved without increasing velocities in the main burning chamber of an incinerator. Also the rate and extent of burning my be controlled.

These benefits are achieved by use of a hearth which permits the burning particles to be moved intermittently in a shuffling fashion through the incineration area of the main burning chamber at a controlled rate. Such movement is provided by suspending the hearth from a fixed frame, where it may move in a limited short arc upon receiving traumatic strokes from mechanical impetus, such as a plurality of rapidly inflating air bags which impell the hearth against the frame and then return the hearth to its initial stroking position. This movement, much like impelling snow from a snow shovel, causes the hearth to move but a short distance, slightly lifting and reshuffling the pile of burning particles and overcoming inertia to move the particles a short distance across the hearth. The action causes the burning pile to open crevices for admitting oxygen, thus providing complete combustion. The rate of flow and burning can be controlled by the amount of air admitted to the burning pile and the frequency and strength of the stroke, and by the cushioning of the impact when the hearth strikes the frame.

The amount and velocity of air supplied to the burning pile is controlled by the size of the nozzles admitting air to the pile, and be the sizing and speed of blowers and their modulation and control in the air delivering system. The frequency of the stroke may be controlled by a timer opening and closing an air line for inflating the air bags. The strength of the stroke may be varied by the quantity and pressure of the air delivered to the air bags. The cushioning of the impact may be controlled by use of mechanically flexible structure, such as rubber bumpers, and by controlling sets of air bags receiving the impact of the movement of the hearth.

OBJECTS OF THE INVENTION

It is an object of the invention to provide a pulsating hearth for an incinerator of the character described.

Another object is to provide an incinerator hearth suspended from a fixed frame for movement in a short arc between an initial point and a point of impact.

Another object is to provide means for stroking a movable hearth upon which a pile of particles is burning to impell the particles a short distance by inertia and concurrently stoking the burning pile upon each stroke.

Another object is to provide sets of inflatable air bags mounted on a fixed frame for intermittent impact with a movable incinerator hearth.

Another object is to provide a plurality of nozzles in a movable incinerator hearth which are in fluid communication with a source of air for delivering gently flowing air to a pile of particles burning on the hearth.

Another object is to provide cushioning structure for receiving the impact of a pulsating incinerator hearth.

Another object is to provide suspension structure for carrying a pulsating hearth of an incinerator without substantially inhibiting its movement by friction.

Another object is to provide shelf and barrier members on a pulsating hearth to inhibit escape of burning particles traveling thereover.

Another object is to provide means for controlling the frequency and strength of the stroke of movements in a pulsating hearth.

Another object is to provide a gang of two or more hearths for an incinerator, one of which is constructed to move a pile of burning particles from its surface to the surface of the adjacent hearth.

Another object is to provide step and tapered wall structure in a pulsating hearth for an incinerator arranged to locate the position of a pile of burning particles situated on the hearth.

Another object is to provide a plenum structure for delivery of air to a pulsating hearth which serves as a rigid structural frame for the hearth.

Another object is to provide seals for a pulsating hearth which are capable of retaining the hearth structure sealed during its movement.

Another object is to provide alignment structure for the hearth and its suspension frame which retains the elements in position for impact and return for intermittent strokes during movement.

Another object is to provide a compressed air delivery and control system for moving a pulsating hearth upon actuation of sets of air bags connected in the system.

Another object is to provide a method for controlling the rate and extent of burning of particles moved across the surface of a pulsating incinerator hearth.

Another object is to provide a pulsating hearth for pollution free full burning of mixed waste of random size particles in an incinerator capable of automatic control and efficient burning as well as recovery of heat generated by combustion.

These and other objects and advantages of the invention will become more apparent as this description proceeds, taken in conjunction with the accompanying drawings.

BRIEF DESCRIPTION OF THE DRAWINGS

In the drawings

FIG. 6 is a detail sectional view of the toggle structure for suspending the hearth from its suspension frame.

FIG. 7 is an elevational view of the structure shown in FIG. 6.

FIG. 8 is a perspective view of part of a pulsating hearth, showing an alternative modified structure for use when two or more hearths are ganged for delivery of burning particles one hearth to the other.

FIG. 9 is a schematic representation of the desired impact and movement of the pulsations for the subject hearth over time and with acceleration.

FIG. 11 is a detail top plan view of a corner of the hearth and suspension frame, showing an alternative modified impact cushioning structure.

FIG. 12 is a detail section view of an alternative modified suspension structure for carrying the hearth on its suspension frame.

FIG. 13 is an elevational view of the structure shown in FIG. 6.

DESCRIPTION OF A PREFERRED EMBODIMENT

Figure 1:
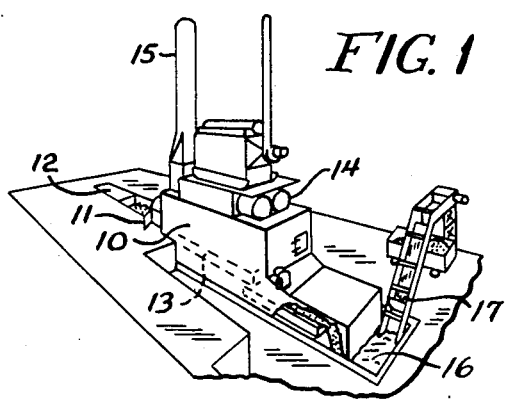
FIG. 1 is a perspective view of an incinerator system embodying the pulsating hearth which is the subject of the present invention.

As shown in FIG. 1, an incinerator system, having a main combustion chamber 10, into which refuse or other materials to be burned are charged, through an entry door 11, by means of a loading device 12, includes one or more hearths 13, upon which the refuse is to be burned. Products of combustion released by burning in the main combustion chamber 10 may be reburned in one or more afterburners 14, and, with or without further processing in a scrubber or other auxiliary equipment, exhausted to atmosphere through a stack 15. Ash created from burning in the main chamber 10 may be conveyed to an ash pit 16, where the ash may be removed by a collector system 17.

In the present invention, particularly with reference to the structure shown in FIGS. 2–7 and 9–10, the main combustion chamber 10 has a hearth 13 which is capable of moving the burning material thereacross until it is ready for disposal. This moving hearth has a fixed frame 19 suspended from which are toggle members 20 carrying a movable superstructure 21. The superstructure 21 has a floor 22, side plates 23, large tubular channels 24, each defining a first set of air plenums 25, angular channels 26, which carry step plates 27, upon which a layer of fire bricks 28 are mounted, and small tubular channels 29, each defining a second set of air plenums 30, which are secured, as by welding, to the top wall of each of the large tubular channels 24. The central floor area 31 and end wall 32, which is preferably tapered, together with the side wall edges 33, of the hearth, are preferably covered with refractory material. For burning of some materials, it is possible to fabricate the entire hearth superstructure 21 from steel or similar material, which preferably may be water cooled.

Passages 30a are preferably formed in the neutral area along the inside walls of the large tubular channels 24 to permit circulation of air within the space defined by the floor 22, side plates 23, tubular channels 24 and 29 and step plates 27. Air may be admitted to the interior of the hearth 13 through air holes 24a formed in the exterior walls of the large tubular channels 24, and those air holes 24a may be in fluid communication with ducts (not shown) connected to air blowers for delivery of air to the interior of the hearth 13.

Depending upon the length and number of hearths 13 used, the hearths may be pitches or tilted in the direction of ash pit 16 to encourage gravity flow of materials burning on the hearth and to provide a longer stroke of the hearth pulsations, in a manner to be described. For example, in a three hearth system, the first hearth (closest to the entry door 11, may be pitched about 1 inch per foot of hearth length, the second hearth may be pitched about ¼ inch per foot of length, and the third hearth may be only slightly tilted. The degree of tilt is one means for controlling the rate of flow across the burning area 31 of the hearth, and other means will be described hereafter.

Extending through the large and small channels 24 and 29, respectively, and the aligned step plates 27 and between fire bricks 28 are a series of nozzle pipes 34, which are of a sufficient length to reach and open into the central floor area 31 of the hearth 13 where burning is intended to take place. The nozzle pipes 34 each have a series of ports 35 in communication with their related plenums 25 and 30, respectively, and one end of each of these nozzle pipes also have a removable plug 36, accessible through the frame 19, to permit them to be reamed for cleaning purposes upon removal of the plugs. These nozzle pipes 34 may also be slightly pitched toward the central burning area 31, preferably about 3°-6°, to inhibit lodging of ash particles therein and for self-cleaning by the gently flowing air passing through the nozzle pipes.

Figure 3A:
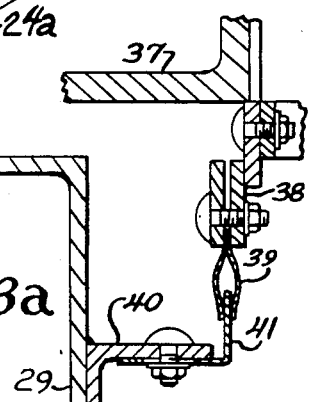
FIG. 3a is a sectional view showing the sealing structure for retaining the hearth closed within the suspension frame.
Figure 3:
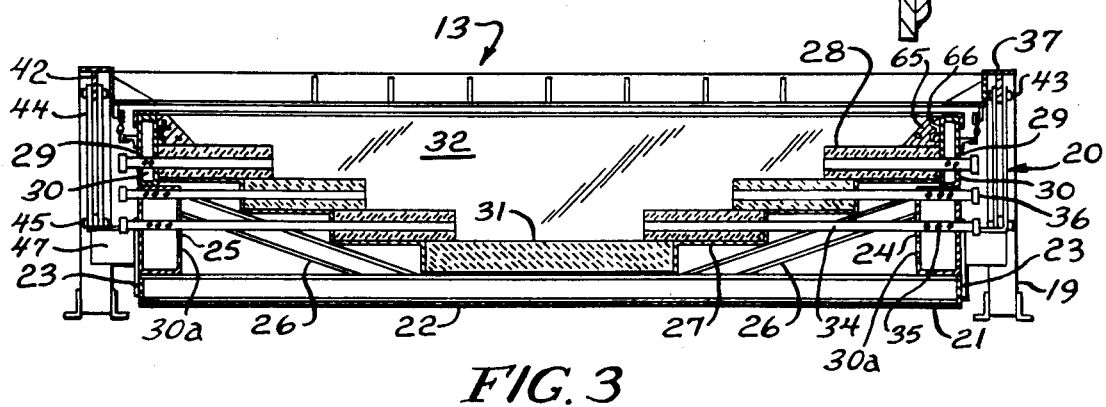
FIG. 3 is a cross-sectional view of the hearth shown in FIG. 2, along line 3—3 thereof, and, additionally showing the suspension frame and sealing structure.

The upper end of the frame 19 carries shelf-like angle plates 37, which extend over the upper wall of the small channels 29 to prevent escape of small burning particles from the central burning area 31. These plates 37 also each carry along their longitudinal edges a bracket 38 to which is connected a pair of spring-like sealing arms 39, and the outside walls of the small channels 29 each carry along their edges a longitudinally extending bracket 40, to which is connected an upstanding sealing strip 41 spring fit between the spring sealing arms 39 (see FIG. 3a). At the charging end of the hearth 13, the exterior of the superstructure 21 (see FIG. 4) has another seal bracket 38a carrying double finger spring strips 41a rubbing against an extension 19a of the frame 19 for sealing the end of the moving hearth in a manner similar to the hearth side arms 39—strip 41 described above.

Angular plates 37 also have depending therefrom a plurality of toggle members 20, which may comprise toggle brackets 42 mounted to the frame 19, through each of which extends a first pivot axle pin 43, and toggle links 44 are pivotally connected to each of said axle pins 43. The other end of each of said toggle links 44 have pivotally secured thereto a second pivotal axle pin 45, and the side plates 23 and large channels 24 have connected, as by welding, to their outside walls a toggle lug 46, which is pivotally secured to the second pivotal acle pin 45. These toggle lugs 46 may be suitably reinforced by angle plates 47 secured to the outside walls of the large tubular channels 24.

At the charging end of the hearth 13, the large channels 24 each extend beyond the end of the hearth to form a U-shaped yoke 50. Likewise, the suspension frame 19 is extended to provide an air bag frame which consists of a header beam 51 on one side of the yoke 50 and an impact beam 52 on the other side of the yoke. The header beam 51 has spaced apart along its length a plurality of like air bags 53, each of which is secured inflatable to that beam by a bracket 54 facing one side of the yoke 50. Yoke 50 has secured thereon in alignment with the air bags 53 push plates 55. The impact beam 52 has arranged along its length, preferably in alignment with each of the header beam air bags 53, carried on the impact beam by brackets 56, another set of air bags, the end air bags 57 of which set are enclosed in a cushioning frame 58 and the central air bags 59 of which set are exposed. The side of the yoke 50 facing the impact beam 52 has impact plates 60 aligned with the impact beam air bags 57 and 59.

Spacing and aligning of the header and impact beams 51 and 52, respectively, relative to the yoke 50, may be set and maintained by rods 61 secured one end to each of said beams. Stops 62, preferably mounted on the respective beams 51 and 52, may be provided adjacent each of said air bags 53 and 57 and 59, respectively. Arms 63 may be secured to the header beam 51 for carrying thereon an accummulator tank 64, which may contain compressed air.

Preferably, upper walls 65 of the burning area 31 consist of a body of refractory and are tapered from the overhanging shelf-like plates 37 toward the edges of the underlying bricks 28, and, like the refractory bodies 32 and 33 are suitably secured to the superstructure 21 by means of refractory anchors 66.

Ganged Hearths

Figure 2:
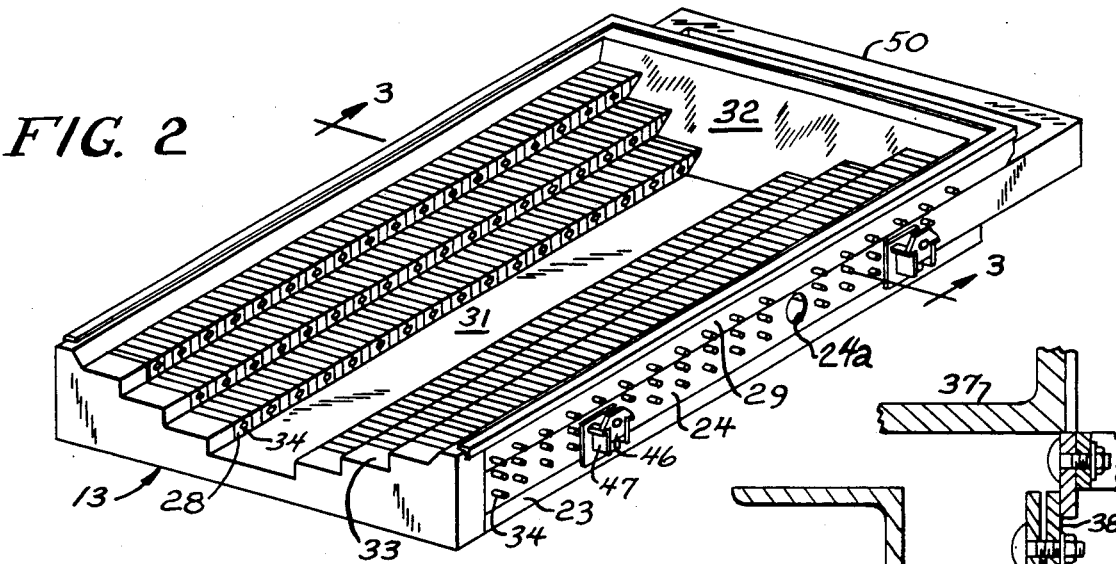
FIG. 2 is a perspective view of a pulsatable hearth embodying the present invention.

In very large incinerators or where a longer incineration time is desired, similar hearths 13 may be ganged in line along their longitudinal axes by use of the structure shown in FIG. 8, providing a central burning area 71 on a first hearth, which feeds burning material to a second hearth like the hearth 13, having a central burning area 31, shown in FIG. 2.

Such ganging of hearths is achieved by extending rods 72 and a plate 73 from the side edge and its underlying structure of a typical pulsatable hearth 13 (shown in FIG. 2) and covering the rods and plate with a body of refractory material 75. These rods 72, plate 73 and body 75 are arranged over the next adjacent hearth, e.g. the aforementioned structure is elevated and extends over the tapered wall 32 (see FIG. 2) on the next adjacent hearth. Piles of particles burning in the central burning area 71 are shuffled thereacross onto the body of refractory material 75, as shown in FIG. 8, where they fall onto the next adjacent hearth, for example, onto the central burning area 31 of the hearth shown in FIG. 2.

Preferably, each of the pulsating hearths have their own suspension and means for delivering pulsating strokes to the hearths, as described herein.

Impact Cushions

As shown in FIG. 11, an impact bumper 80, preferably a sheet of rubber of about 40 durometer having a typical thickness of about 3 inches, may be substituted for the end air bags 57 and their cushioning frames 58 (shown in FIGS. 4 and 5), but secured to the brackets 56 shown. A bumper plate 81, aligned with the impact bumper 80, may be mounted on the plate 60 secured to the yoke 50. In this arrangement, impact plate 81 on yoke 50 is thrust and bounced against bumper 80 on the impact beam 52, compressing the impact bumper to a typical thickness of about 1 inch during the thrust of each initial pulsation stroke.

Figure 4:
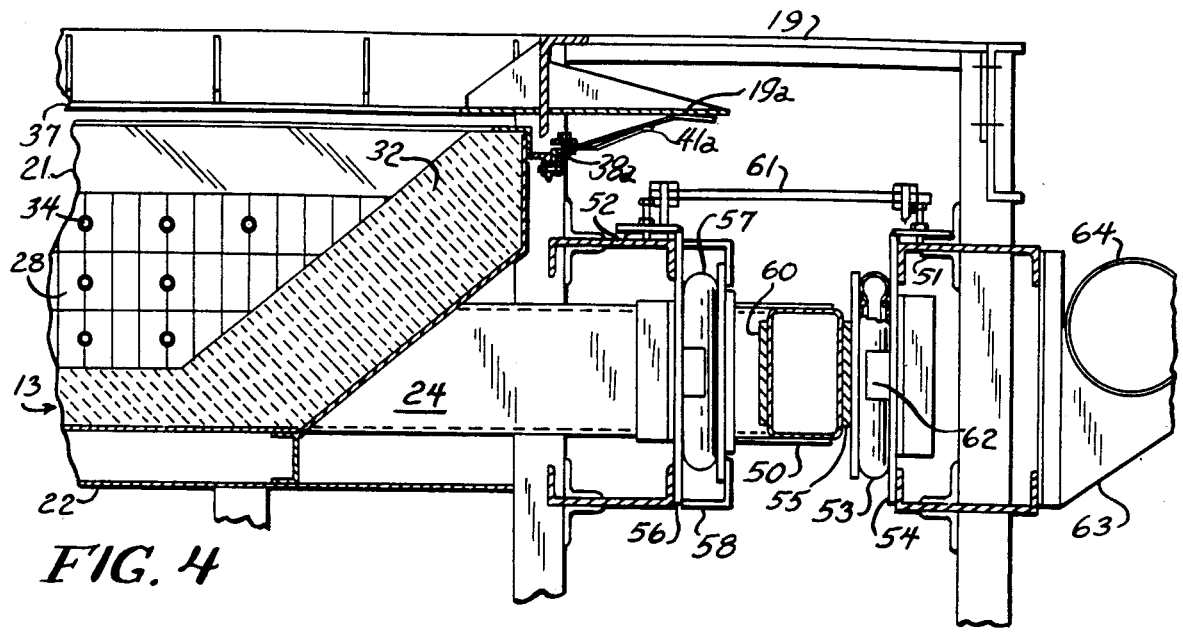
FIG. 4 is a vertical sectional view of part of the hearth and frame structure, including the means for delivering impact to the pulsating hearth.
Figure 5:
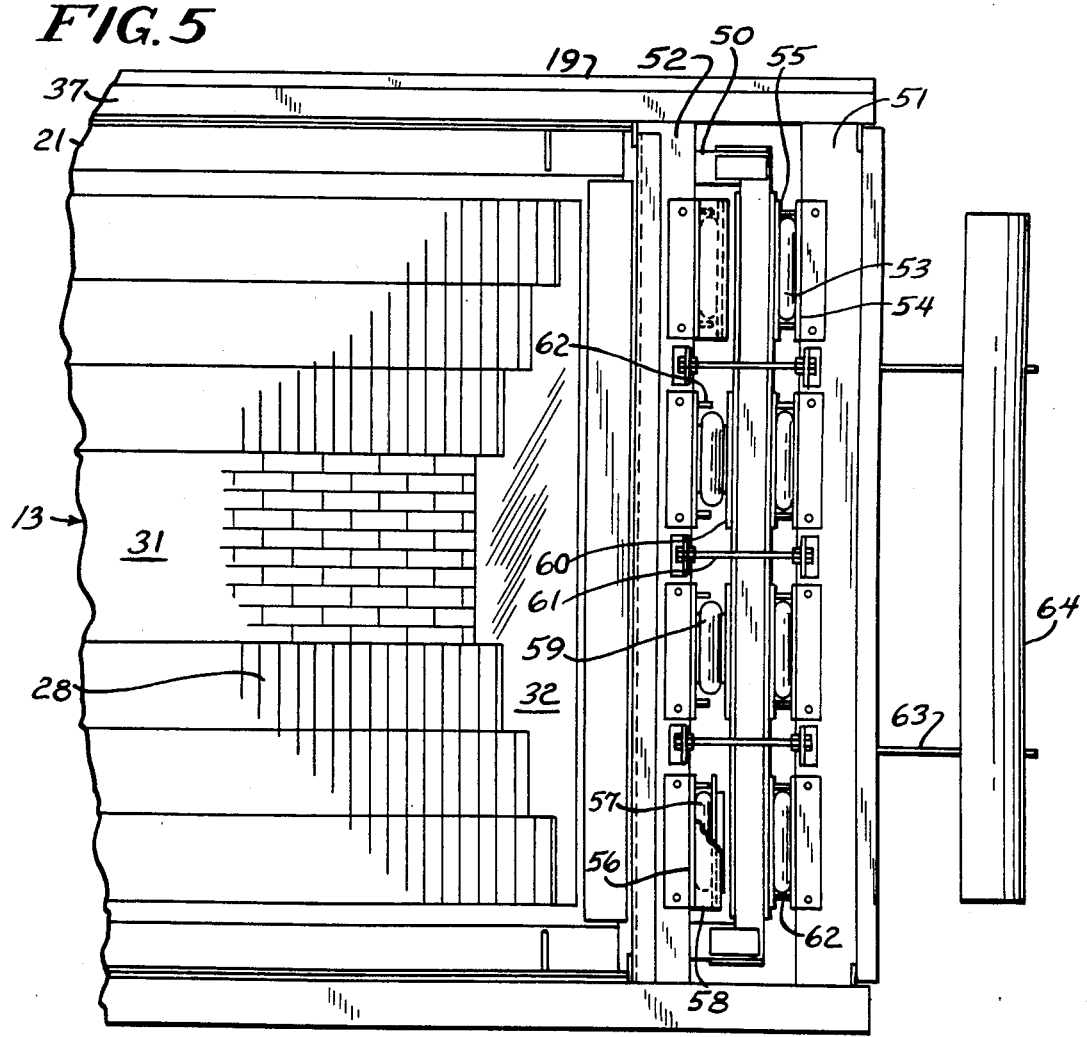
FIG. 5 is a top plan view of the structure shown in FIG. 4.

In all cases, even with this modified impact bumper arrangement, the central air bags 59 are preferably present and inflated for returning the yoke 50 from its stroked position to its initial stroking position shown in FIGS. 4 and 5.

Stroking System

Figure 10:
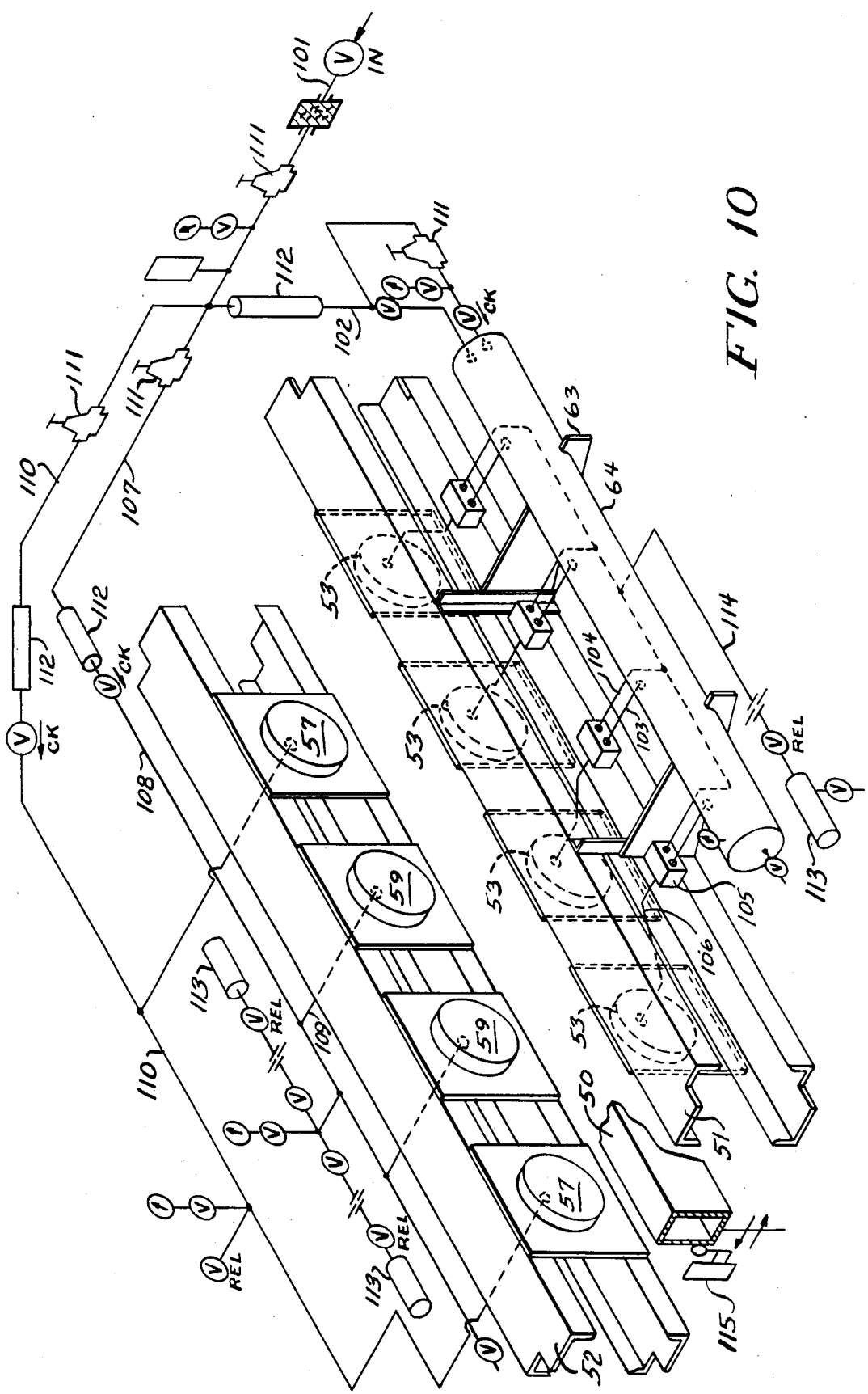
FIG. 10 is a schematic representation of the compressed air delivery and control system for pulsating the hearth.

Stroking of the hearth(s) 13 by movement of the yoke 50 from its initial position, i.e. against the header beam 51, thrust against the impact beam 52, and returning the stroked yoke to its initial position, may be accomplished by use of the stroking system shown in FIG. 10.

In this system, compressed air is delivered from a compressor (not shown) from the "IN" side of the line through an inlet valve into conduit 101, which may have therein a filter, and is regulated by a regulator 111. This conduit 101 may also have a valve and pressure guage and a pressure switch therein. The conduit 101 is in flow communication with a branch conduit 102, which may be connected through a flexible hose 112, where the conduit 102 divides into two legs, one leg of which having another regulator 111 and a pressure guage and value, and the other leg of which may also have a valve, both legs being connected to the accumulator or air receiver tank 64, which may have a pressure guage therein and a blow-down valve at the extreme end thereof.

Parallel conduits 103 lead from the tank 64 to three way solenoid valves 105. The solenoid valves 105 also have exhaust lines 104 extending therefrom. Air lines 106 connect each of the solenoid valves 105 to each of the air bags 53. Thus, when the solenoid valves 105 are open, from the tank 64 to the air bags 53, air will rush into and very rapidly inflate the air bags 53, causing them to expand immediately and kick the yoke 50. Preferably, these solenoid valves 105 are adjustable within a range of about 5–150 lbs. and are adapted to open at about 80 psi.

Compressed air is also delivered through conduit 101 to another branch conduit 107, which has another regulator 111 therein, and which connects to bumper and return air bag conduit 108, through a flexible hose 112 and a check valve. This conduit 108 connects with parallel conduits 109 leading to central air bags 59 and also has a relief line, having therein a pressure guage, and relief and control valves, terminating in mufflers 113 exhausting to atmosphere.

Also connected to the conduit 101 through a regulator 111, flexible hose and check valve is the impact cushion conduit 110, leading to the end impact cushioning air bags 57, and this line also may have therein a pressure guage and relief valve. Preferably, pressure is steadily maintained in these impact cushioning air bags 57, so that only as they lose pressure is air injected into them.

Air entering the bags 59 is not admitted with a surging action, as is the case with air bags 53 where the air is rapidly injected into those bags, and the filling of bags 59 is only sufficient to move the yoke 50 from its thrust position against the impact beam 52 back to its initial position against the header beam 51.

The exhaust lines 104 lead from the solenoid valves 105 to a collector conduit 114 which terminates in a relief valve exhausting the conduit 114 to atmosphere through a muffler 113. When the yoke 50 is stroked by air bags 53, the movement of the yoke may activate a limit switch 115, which closes the solenoid valves 105 and opens the bags 53 to bleeding to atmosphere through exhaust line 104 and conduit 114.

When the yoke 50 has been thrown toward the impact beam 52 and bounced against the cushion air bags 57, the central bags 59 are filled through line 109, thus returning the yoke 50 to its initial position against the air bags 53 on header beam 51.

The strength of the throw and its cushioning may be controlled by the pressure and sizing of conduits and components of the compressed air delivery system. The interval between strokes can be controlled by timer mechanism opening and closing the solenoid valves 105.

MODIFIED SUSPENSION MEMBERS

The toggle members 20, shown in FIGS. 6 and 7, are intended to provide free suspension of the hearth superstructure 21 from its suspension frame 19 and uninhibited movement in a short limited arc, usually not more than 4–8 inches, with sufficient momentum to impell the load of random size burning particles randomly arranged in piles on the hearth and stoke the pile, thus moving the particles forward across the hearth and rearranging the piles. This free suspension and uninhibited swinging in the fashion described requires free movement of the toggle members in such a way that the floor has relatively frictionless movement in a defined arc without canting the hearth to jam its swing. The toggle links 44 pivotally arranged, preferably aided by swivel bearing joints 43a, as shown in FIG. 6, is one means to provide such movement.

Another means is shown in FIGS. 12 and 13, where modified toggle members 120 comprise cable links 121 suspended between pairs of pivotable bearing pulleys 123, one of the pair mounted on the toggle bracket 42 and the other of the pair carried by the toggle lug 46.

Acceleration Curve

By means of the structure and system described above, the desired acceleration of the yoke 50 and its connected hearth 13 may be achieved. A typical acceleration curve, measured over time and distance, is shown in FIG. 9.

When the air bags 53 are inflated by opening of the solenoid valves 105, at point A on the FIG. 9 graph, the yoke is moved to point B of maximum positive acceleration on its forward stroke. When the yoke 50 first hits the impact beam 52 at point B, negative acceleration begins, at which time the yoke has reached its maximum stroke, but the particles continue to be propelled forwardly, and the yoke 50 bounced against the impact beam 52 at point D, yielding to the return of the yoke 50 pushed off by the return air bags 59 until the yoke has come to rest against the header beam 51 and its air bags 53 then deflated at point E.

This stroke measurement has been recorded on chart paper marked in centimeters, and with reference to the curve one centimeter of the charge represents about 0.2 second real time for the entire acceleration stroke, and the rate of acceleration, depending in great part upon the load applied to the hearth, varies from 0.053 g at no load other than the hearth itself to 0.8 g per centimeter of chart paper when a load is applied.

The rapid and adequate acceleration and the aftershock following the build-up of momentum is demonstrated by the FIG. 9 acceleration curve, and such acceleration force is required to sufficiently overcome inertia for movement of the particles and rearranging them in order to achieve both adequate combustion and travel.

While a preferred embodiment and alternate and modified structure for the pusating hearth has been shown and described, many changes in details and arrangement of the pulsating hearth may be made without departing from the scope or spirit of the invention. Accordingly, it is not desired that the invention should be limited to the exact construction and system shown and described.

I claim:

1. A material moving system comprising a fixed suspension frame and a superstructure suspended from said frame for limited arcuate movement of said superstructure relative to said frame, said superstructure including a central area thereon adapted to receive a pile of particles, and means for stroking and stopping movement of said superstructure relative to said frame to compel movement of said particles when arranged on said area responsive to each stroking and stopping of said superstructure, said superstructure having a yoke extending from one side thereof and said frame having a beam on each of opposed sides of said yoke defining predetermined positions for stroking and stopping movement of said superstructure relative to said frame.

2. In the system recited in claim 1, wherein said frame includes positioning means for changing said predetermined positions of said beams relative to each other.

3. In the system recited in claim 1, wherein each of said beams has stops extending in the direction of said yoke.

4. In the system recited in claim 3, wherein said beams are connected spaced apart in alignment with said yoke.

5. A material moving system comprising a fixed suspension frame and a superstructure suspended for limited arcuate movement of said superstructure relative to said frame, said superstructure including a central area thereon adapted to receive a pile of particles, and means for stroking and stopping movement of said superstructure relative to said frame to compel movement of said particles when arranged on said area responsive to each stroking and stopping of said superstructure, said stroking and stopping means comprising a fluid system including inflatable air bags and means for rapidly inflating said air bags upon each stroke of said stroking and stopping means.

6. In the system recited in claim 5, wherein said superstructure has a yoke extending from one side thereof and said frame has a beam on each of opposed sides of said yoke defining predetermined positions for stroking and stopping movement of said superstructure relative to said frame and wherein said stroking and stopping means comprises said air bags on one of said beams and impact cushion means on the other of said beams.

7. In the system recited in claim 6, wherein one of said beams has fluid operated means for moving said yoke away from said impact cushion means.

8. In the system recited in claim 7, wherein said fluid system has control means selectively operable to inflate said air bags and to actuate said fluid means for moving said yoke away from said impact cushion means.

9. In the system recited in claim 8, wherein said control means includes means for repeating operation of said stroking and stopping means.

10. In the system recited in claim 9, further including timer means controlling the frequency at which the operation of said stroking and stopping means is repeated.

11. In the system recited in claim 10, including means for controlling the strengths of the stroking movement of said superstructure.

12. In the system recited in claim 11, further including means for controlling the stopping of the movement of said superstructure relative to said frame.

13. In the system recited in claim 5, wherein said fluid system comprises conduit for conveying compressed air, a compressed air receiving tank connected to said conduit, said air bags being in flow communication with said tank, solenoid valve means for controlling delivery of compressed air from said tank to said air bags, flow control valves and regulator means in said conduit, and control means for opening and closing said solenoid valve means and said flow control valves and regulator means.

14. A material moving system comprising a fixed suspension frame and a superstructure suspended from toggle members from said frame for limited arcuate movement of said superstructure relative to said frame, each of said toggle members being coupled to first points on said frame and second points on said superstructure with the first point for a particular toggle member being located above the second point for said particular toggle member, said superstructure including a central area thereon adapted to receive a pile of particles, and means for stroking and stopping movement of said superstructure relative to said frame to compel movement of said particles when arranged on said area responsive to each stroking and stopping of said superstructure.

15. In the system recited in claim 14, wherein said toggle members comprise links pivotally connected to said superstructure.

16. In the system recited in claim 14, wherein said toggle members comprise spaced apart pulleys, one of which pulleys is connected to said superstructure, and cable links connecting said pulleys.

17. A material moving system comprising a fixed suspension frame and a superstructure suspended for limited arcuate movement of said superstructure relative to said frame, said frame having a shelf-like extension extending over the top edges of said superstructure, said superstructure including a central area thereon adapted to receive a pile of particles, and means for stroking and stopping movement of said superstructure relative to said frame to compel movement of said particles when arranged on said area responsive to each stroking and stopping of said superstructure.

18. A material moving system comprising a fixed suspension frame and two superstructures aligned along the same longitudinal axis with one of said superstructures positioned elevated above the other of said superstructures with said superstructure suspended from said frame for limited arcuate movement of said superstructure relative to said frame, each of said superstructures including a central area thereon adapted to receive a pile of particles, and means for stroking and stopping movement of said superstructures relative to said frame to compel movement of said particles when arranged on said areas responsive to each stroking and stopping of said superstructure.

19. In the system recited in claim 18, wherein said elevated superstructure has extending from one edge thereof an extension.

20. In the system recited in claim 19, wherein the other of said superstructures has an end wall which is tapered toward its area, and said extension of said elevated superstructure overlies said tapered wall.

21. A material handling system comprising a fixed suspension frame and a superstructure suspended for limited movement of said superstructure relative to said frame, said superstructure including a central area thereon adapted to receive a pile of particles, impelling means coupled to said frame or superstructure for providing said superstructure with first and second types of motion relative to said frame, said first and second types of motion being in first and second directions, respectively, opposite to each other and having first and second accelerations, respectively, substantially different from each other to compel movement of said particles when arranged on said area responsive to said first type of motion of said superstructure.

22. The system of claim 21, wherein said first acceleration produces said type of motion in said first direction at a higher speed than said second type of motion in said second direction.

23. The system of claim 22, wherein said impelling means also provides said superstructure with an upward component of motion.

24. The system of claim 23, wherein said compelling means comprises a fluid system including inflatable air bags and means for rapidly inflating said air bags upon each stroke of said impelling means.

25. The system of claim 24, wherein said superstructure includes a yoke extending from one side thereof and said frame has a beam on each of opposed sides of said yoke defining predetermined positions for the termination of said first and second types of motion and wherein said impelling means comprises said air bags on one of said beams and impact cushion means on the other of said beams.

26. The system of claim 25, further including fluid operated means, on one of said beams, for moving said yoke away from said impact cushion means.

27. The system of claim 26, wherein said fluid system has control means selectively operable to inflate said air bags and to actuate said fluid means for moving said yoke away from said impact cushion means.

28. The system of claim 27, wherein said control means includes means for repeating operation of said impelling means at predetermined time intervals.

29. The system of claim 22, wherein said frame has a shelf-like extension extending over the top edges of said superstructure.

30. The system of claim 22, wherein said superstructure is a first superstructure and further including a second superstructure with said first and second superstructures aligned along the same longitudinal axis and one of said first and second superstructures is positioned elevated above the other of said first and second superstructures.

31. The system of claim 30, wherein said one superstructure has extending from one edge thereof an extension.

32. The system of claim 31, wherein said other of said superstructures has an end wall which is tapered toward its area, and said extension of said one superstructure overlies said tapered wall.

33. A method for moving material comprising: placing random sized particles arranged in piles on an area of a platform, stroking said platform in an arcuate movement in one direction to lift the particles, sufficiently abruptly stopping movement of said platform to, after said platform has stopped moving in said one direction, shuffle the particles across said area in said one direction and stoke the particle piles, and returning the platform in a direction opposed to said one direction to an initial stroking position.

34. In the method recited in claim 33, wherein said steps are repeated at timed intervals.

35. In the method recited in claim 34, wherein a compressed air system is provided for generating said stroking and returning action.

36. In the method recited in claim 35, with the additional step of controlling delivery of air through said compressed air system.

37. In the method of claim 36, further including controlling the lengths of said time intervals.

38. In the method of claim 37, wherein the strengths of the stroking said hearth is controlled.

39. In the method recited in claim 38, wherein the rate of abruptly stopping the movement of said hearth is controlled.

40. A method for moving material comprising: placing random sized particles arranged in piles on an area of a platform, moving said platform in a first direction with a first speed to shuffle the particles across said area in said first direction and stoke the particle piles, and moving said platform in a second direction opposed to said first direction with a second speed substantially less than said first speed.

41. A method for moving material comprising: placing random sized particles arranged in piles on an area of a platform, moving said platform in one direction from a first position to a second position, inducing a shuddering of said hearth while remaining at said second position, and returning the hearth in a direction opposed to said one direction to said first direction.

* * * * *